United States Patent [19]

Hibbard

[11] Patent Number: 5,237,167
[45] Date of Patent: Aug. 17, 1993

[54] AUTOFOCUSSING SYSTEM HAVING ANAMORPHIC OPTICS

[75] Inventor: Robert H. Hibbard, Fairport, N.Y.

[73] Assignee: Eastman Kodak Company, Rochester, N.Y.

[21] Appl. No.: 809,997

[22] Filed: Dec. 18, 1991

[51] Int. Cl.⁵ .................................................. G02B 7/28
[52] U.S. Cl. .................................... 250/201.8; 354/406
[58] Field of Search ............... 250/208.1, 206.1, 206.2, 250/201.2, 201.3, 201.4, 201.5, 201.6, 201.7, 201.8, 204; 359/668, 669, 670, 671; 356/1, 4; 354/402, 404, 406, 407, 408

[56] References Cited

U.S. PATENT DOCUMENTS

| | | |
|---|---|---|
| 3,364,830 | 1/1968 | Aschenbrenner et al. ......... 359/668 |
| 3,644,037 | 2/1972 | Larraburu ........................... 359/668 |
| 4,158,134 | 6/1979 | Martin et al. ....................... 359/668 |
| 4,766,302 | 8/1988 | Ishida et al. ...................... 250/201.8 |
| 4,970,384 | 11/1990 | Kambe et al. .................... 250/201.6 |
| 5,024,529 | 6/1991 | Svetkoff et al. ..................... 356/376 |

*Primary Examiner*—David C. Nelms
*Assistant Examiner*—John R. Lee
*Attorney, Agent, or Firm*—Kevin A. Sembrat; Mark Z. Dudley

[57] ABSTRACT

Anamorphic optics in a phase correlation autofocussing system modify the aspect ratio of separation images that are incident on a separation image signal conversion means such as a CCD array, thus enabling the autofocussing to be carried out with respect to a plurality of subjects at the extremes of a subject field.

24 Claims, 7 Drawing Sheets

AUTOFOCUSSING SYSTEM HAVING ANAMORPHIC OPTICS

CROSS REFERENCE TO RELATED APPLICATIONS

This application is related to co-pending, commonly-assigned applications entitled METHOD AND APPARATUS FOR SUBJECT FIELD DEPTH DETERMINATION IN AN AUTOFOCUSSING IMAGING SYSTEM, application Ser. No. 07/809,743 filed Dec. 18, 1991, and METHOD AND APPARATUS FOR THROUGH-THE-LENS DISTANCE DETERMINATION, application Ser. No. 07/809,999filed on even date herewith in the name of R. H. Hibbard.

FIELD OF THE INVENTION

The present invention relates to autofocussing systems for use in an imaging system.

BACKGROUND OF THE INVENTION

An image acquisition or recording system (hereinafter, imaging system) is often used to acquire an image of a selected plurality of subjects located in a subject field. The subject plurality will typically include a principal subject that is located at a position with respect to other (secondary) subjects. The subject field height is defined by the subjects at the upper and lower extremes of the image field. It is often a goal of the operator of the imaging system to acquire an image of the subject plurality such that not only a principal subject but also one or more of the secondary subjects may be reproduced sharply. Consequently, autofocussing systems have been devised to set the focus of the imaging system so that the primary subject within the subject plurality is focussed adequately. In practice, however, some secondary subject positions in the upper and lower portions of the image field are such that they are not adequately focussed or are not within the field of view of the autofocussing system.

Accordingly, there have been proposed automatic focusing devices that perform focus detection with respect to a plurality of divided areas of the subject field, and the focusing condition of a continuous-focus optical assembly is controlled in accordance with the plurality of focus detection determinations.

An autofocussing system can be categorized according to whether it focusses through an image-taking lens system or through an independent optical system. In particular, one system is known in the art as a through-the-lens (TTL) phase-correlation autofocus system; one exemplary construction of the optical system used in a TTL autofocus system is shown in FIG. 1. First and second subject images are passed through an objective lens 12 at respective first and second portions distant from the optical axis 13. At a position equivalent to a predetermined focal plane 14 of the objective lens 12, there is disposed an autofocus module which may include a condenser lens 16, a pair 17 of image-forming lenses 18 and 20, and a linear array 21 of photoelectric conversion devices. The array 21 includes sections 22 and 24 disposed on the image-forming planes of image-forming lenses 18 and 20. Array sections 22 and 24 are respectively composed, for example, of first and second pluralities of photo diode cells $a_1$–$a_{10}$. . . , and $b_1$–$b_{16}$. . . . The output of each cell in array 21 section 22 is provided to a correlation system 28 to be sequentially converted to a digital signal $D(x)$ ($x = 1, 2, 3, 4, 5, \ldots$). This image signal data $D(x)$ may then be provided to other means (not shown) for AF processing.

A side view of the optical system of FIG. 1 is shown in FIG. 2(a), with the condenser lens 16 omitted for clarity. The separation lenses 17 are located laterally adjacent from the optical axis 13 and the linear array 21 is located on the optical axis 13 with its longitudinal axis parallel to the disposition of the separation lenses. As illustrated by the representation of the image field 22, the line sensor location corresponds to a central portion of the image field, so as to adequately sense separation images of a subject centrally located (for example, at point P1) in the image field.

Illustrated in FIG. 2(b) is a simplified representation of the conventional approach to effecting autofocussing of a subject located at a point vertically displaced from the optical axis (for example, at point P2). A second detection system including paired separation lenses 17A and linear array 21A are located at positions commensurately displaced from the optical axis 13. As illustrated again by the representation of the image field 22, the location of line sensor 25 corresponds to a vertically-displaced portion 26, so as to adequately sense separation images of the subject located at point P2.

Rather than include additional separation lens pair 24 and line sensor 25 combinations, an alternative approach is to greatly enlarge the central lens pair 18, 20 and provide an area array in lieu of the linear array 21 of FIG. 2(a).

A significant disadvantage of the first of the above-described approaches is that an undesirably large and/or complex arrangement of detection systems must be constructed to provide adequate autofocussing of the various subjects that may be present at locations displaced vertically from the optical axis. Further, the second approach (which attempts to enlarge the optical elements and provide an area array) is generally impractical due to the constraints imposed by basic optical design considerations and by the cost of fabrication of large-scale electro-optical sensors.

There is accordingly a need for an improved autofocussing system that can accurately focus one or more subjects displaced from the central portion of the image field, without the disadvantages found in the methods and apparatus of the prior art.

SUMMARY OF THE INVENTION/PROBLEM SOLVED

According to the present invention, I have discovered that separation images may be provided in a an autofocussing imaging system by use of an image signal forming means that has an anamorphotic optical characteristic. As a result, the subject field that may be imaged on a given image signal conversion means, such as a CCD array, is greater than would otherwise be accommodated in a conventional autofocussing system. In particular, a subject that is located in the subject field at a position displaced from a given optical axis is imaged such that the separation images are incident on a linear CCD array of moderate size. Accordingly, relatively narrow arrays may be used with no compromise in the subject field height. Preferred embodiments of an imaging system constructed according to the present invention will better focus the images of subjects that lie at the extremes of the subject field, as compared to conventional methods and apparatus.

The present invention will become more apparent when taken in conjunction with the following description and drawings, wherein like characters indicate like parts and wherein the drawings form a part of the present description.

DESCRIPTION OF THE PREFERRED EMBODIMENTS

Figure 1:
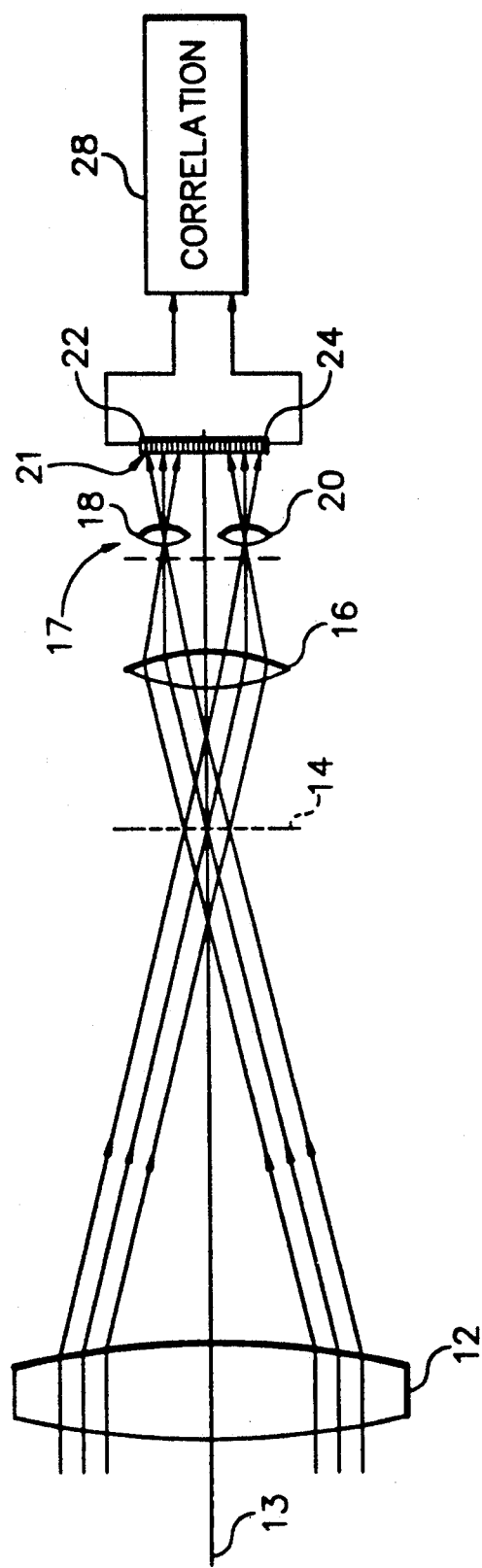
FIG. 1 shows a plan view of an optical system in a phase-correlation autofocus system of the prior art.
Figure 2A:
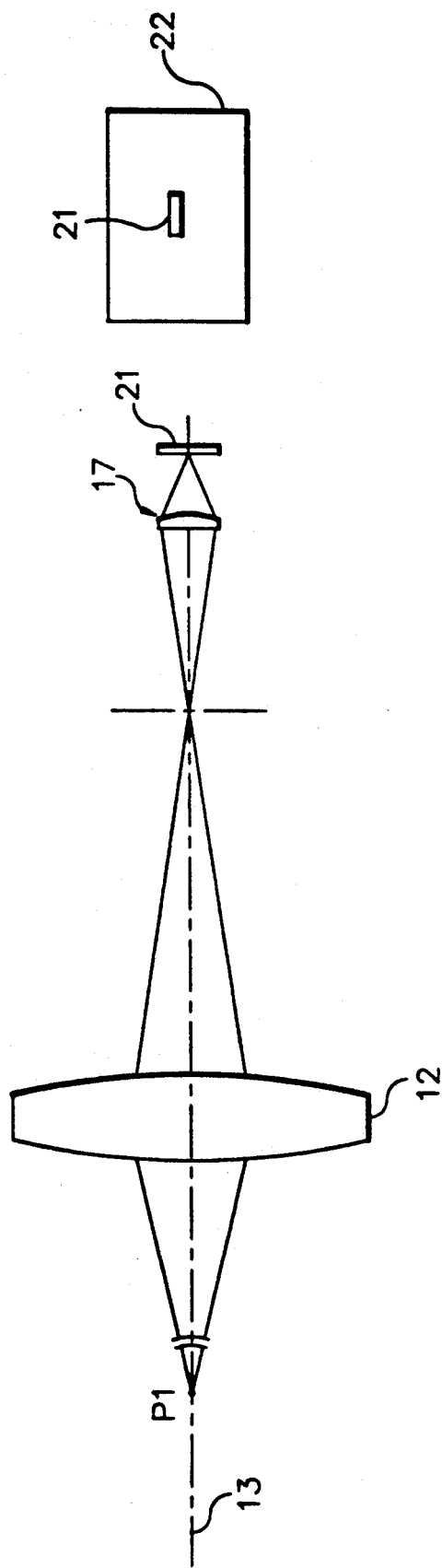
FIGS. 2(a) and 2(b) show side views of the optical system of FIG. 1 and a similar system, respectively, for explaining their operating principle.
Figure 2B:
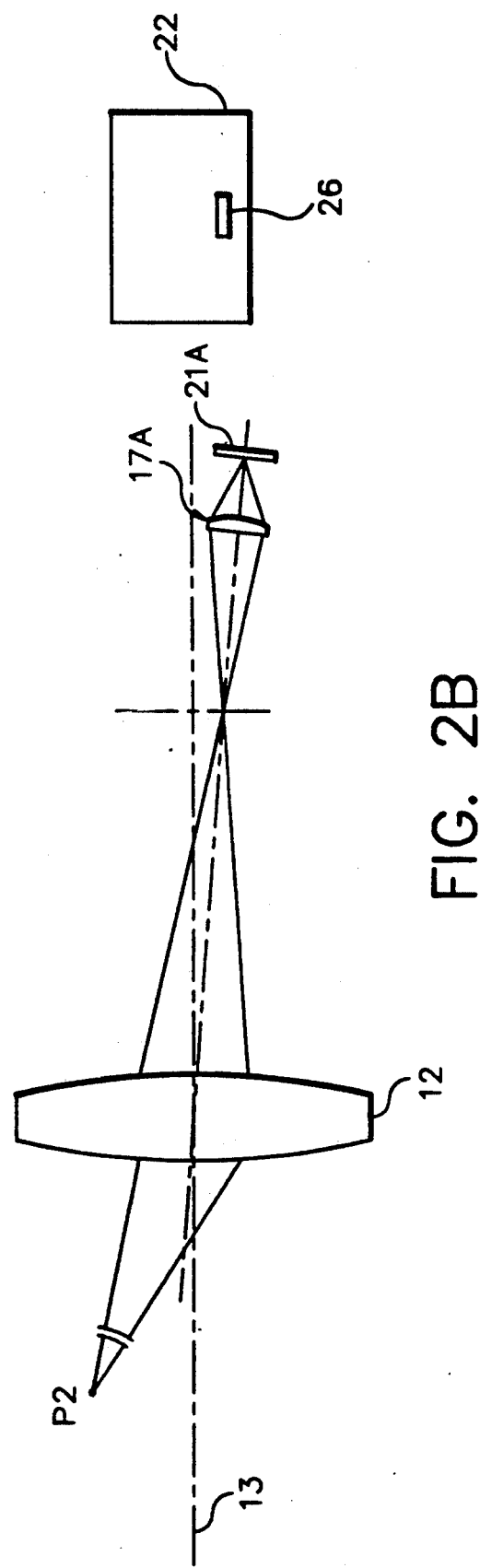
Figure 3:
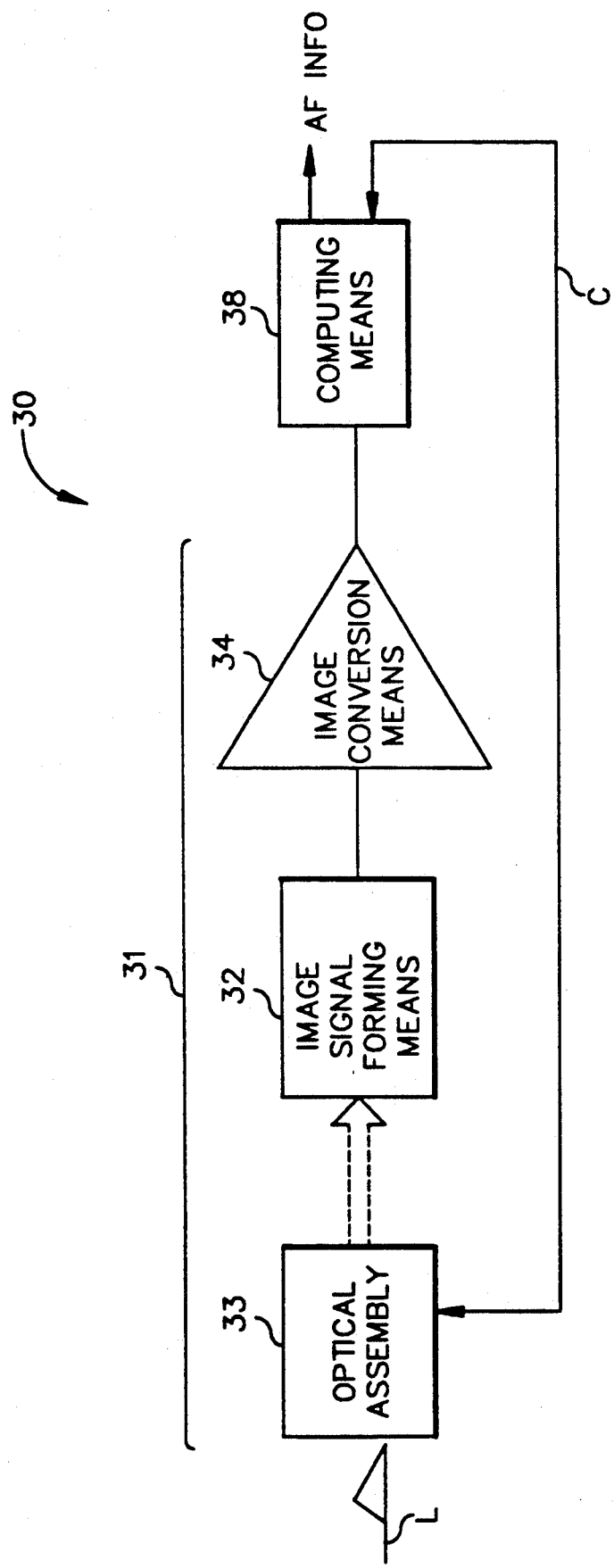
FIG. 3 is a simplified schematic representation of an improved autofocussing system constructed according to the present invention.

Referring now to FIGS. 3 through 7, the subject invention will be understood in detail. FIG. 3 shows a schematic block diagram of an improved autofocussing system 30 constructed according to the present invention. A preferred embodiment of the apparatus 30, when incorporated into an imaging system such as a camera, can provide the imaging system with autofocussing information AF INFO for use in performing such ancillary imaging operations as focussing and autocomposition.

In FIG. 3, an image receiving assembly 31 includes, as shown in simplified form, image signal forming means 32, an optical assembly 33, and an image conversion means 34. The image signal forming means 32 will be discussed in detail with reference to FIGS. 4 et seq. The optical assembly 33 preferably includes an optical lens system having least one focusable lens element, and may also include one or more lens element actuator means for setting the focus and focal length, and known encoder means that provide positional data feedback on the position of at least the optical element. Information derived from the light incident on the image signal conversion means 34 is received by suitable memory and a processing circuitry in the computing means 38 for subsequent autofocus processing therein. The computing means 38 thus is preferably implemented as, or includes, an integrated circuit microcomputer in a form such as a microprocessor of embedded microcontroller.

Thus, light L received from a given subject field having a plurality of subjects to be imaged is passed through the optical system 33 and the image signal forming means 32 to the image signal conversion means 34. The latter includes sense means such as a charge coupled device (CCD) array, wherein the electrical outputs of picture element cells are provided to an interface in the calculation means 38 to be sequentially converted to a digital electrical signal. This signal, along with other signals and data from other sources (not shown) are then processed by the computing means 38 to provide various control signals, such as an optical element position control signal on line C to effect a particular positioning of one or more optical elements for an in-focus condition.

Figure 4:
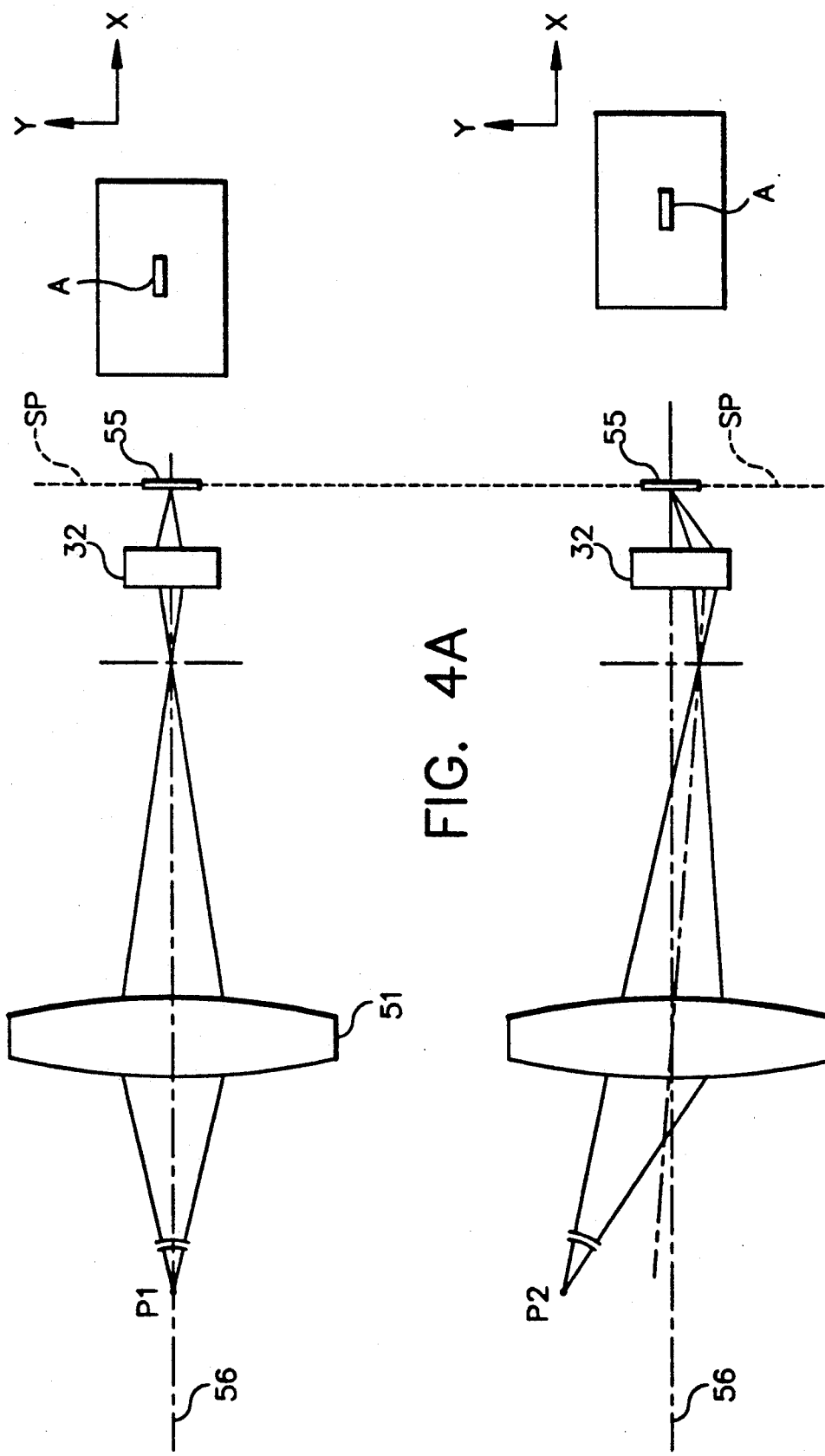
FIGS. 4(a) and 4(b) are simplified side views of the image receiving system of the improved autofocussing system of FIG. 3.

FIGS. 4 et seq. are illustrative of a preferred embodiment of the improved autofocussing system 30 intended for use in an application of the present invention to a single lens reflex photographic or still video camera. Such application should not be interpreted as limiting, however, as the present invention may be realized in embodiments suitable for application to other imaging systems. Moreover, the image-receiving assembly 31 may include other elements or devices, and may be interconnected with other subsystems, as required by design objectives particular to the application and as known in the art.

Turning now to FIGS. 4(a) and 4(b), and with the foregoing description of FIG. 3 in mind, it will be recognized that numeral 51 denotes a focussing lens. The image signal conversion means 34, constructed in the form of an area or linear CCD array 55, is located in the sensor plane SP. The image signal conversion means 34 therefore is capable of accepting light patterns incident in an area A having a relatively small width (along transverse axis y) and a conventional length (along longitudinal axis x).

According to the present invention, light from a subject P1 or P2 is focussed through the lens 51 and is directed through the image signal forming means 32 such that the exit pupil of the lens is directed to the CCD array 55 as two subject images. The spacing between the two images (termed hereafter the separation images) will vary, depending upon whether the lens is in in-focus condition or out-of-focus condition with respect to the respective subject P1 or P2. From the image spacing it is possible to determine a defocus amount of the photographic lens, as known in the art.

However, in a departure from the prior art, the subject field is imaged by the image signal forming means 32 such that it is compressed in the dimension transverse to the CCD array 55 (i.e., along axis y) so as to image a significantly greater area than would be provided in autofocussing systems of the the prior art. This result is useful in performing an improved autofocussing function with respect to a subject field that includes subjects (such as subject P2) that are displaced along the dimension of compression (e.g., the y axis).

Figure 5:
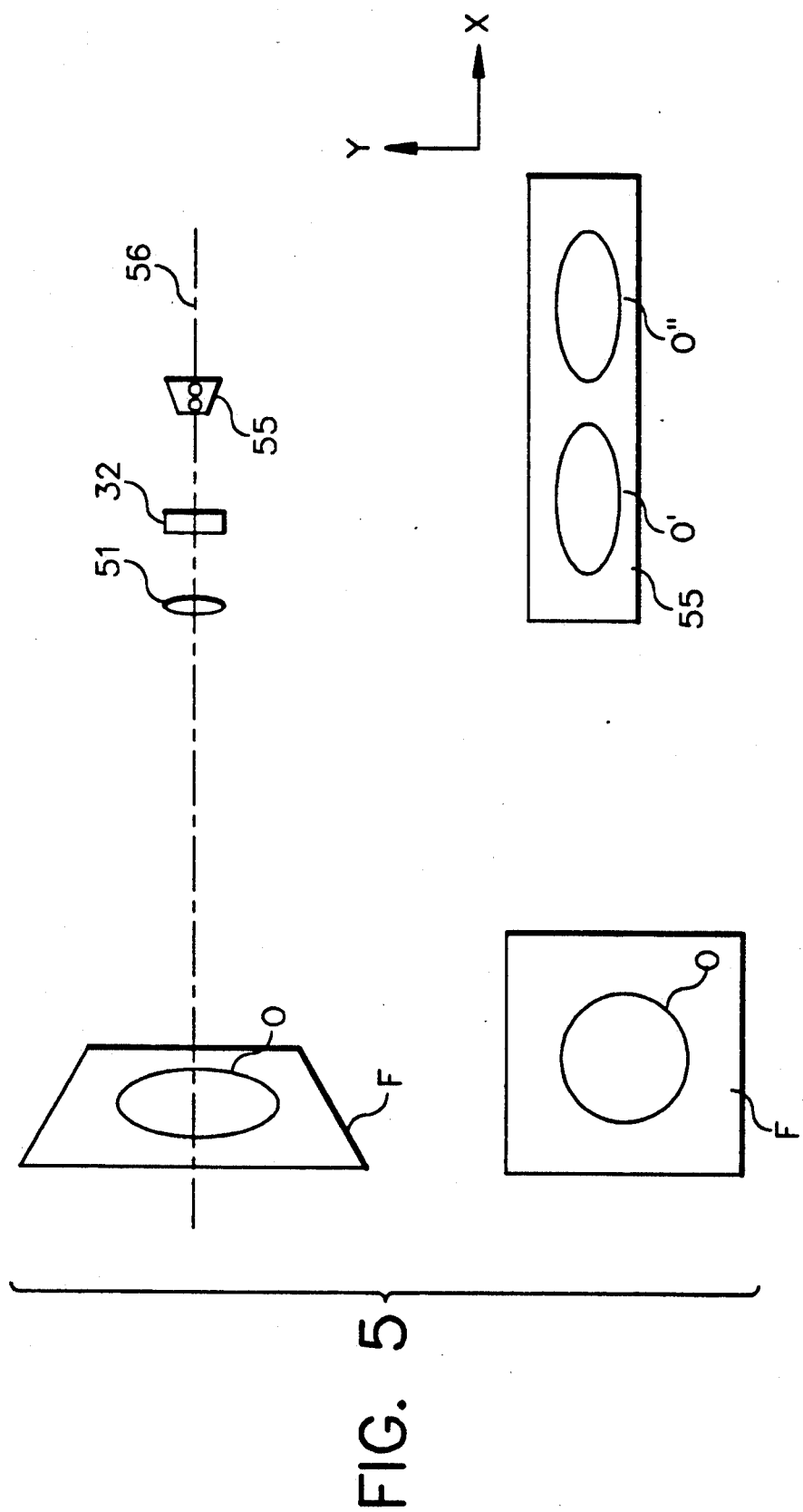
FIG. 5 is a simplified schematic representation of the operation of the image receiving system of FIG. 4, illustrating the desired aspect ratio compression of a given subject field.

With reference now to both FIGS. 4 and 5, it will be appreciated that the image signal forming means 32 is positioned on the optical axis 56 between the focussing lens 51 and CCD array 55. A given subject field (illustrated for clarity as a circle 0) in a field of view F is imaged as duplicate separation field images 0' and 0", each having a width as would be imaged by the lens 51 alone. However, the image heights of the separation images 0' and 0" are compressed. That is, the image signal forming means 32 performs two optical functions with respect to a subject field (which presumably contains a plurality of subjects): 1) the production of separation images and 2) anamorphosis. The degree of compression may be, for example, 2×, so that twice as much of the subject field 0 may be imaged on the CCD array 55 in the vertical dimension as would be received if the contemplated anamorphic characteristic were not present in the image signal forming means 32.

Figure 6:
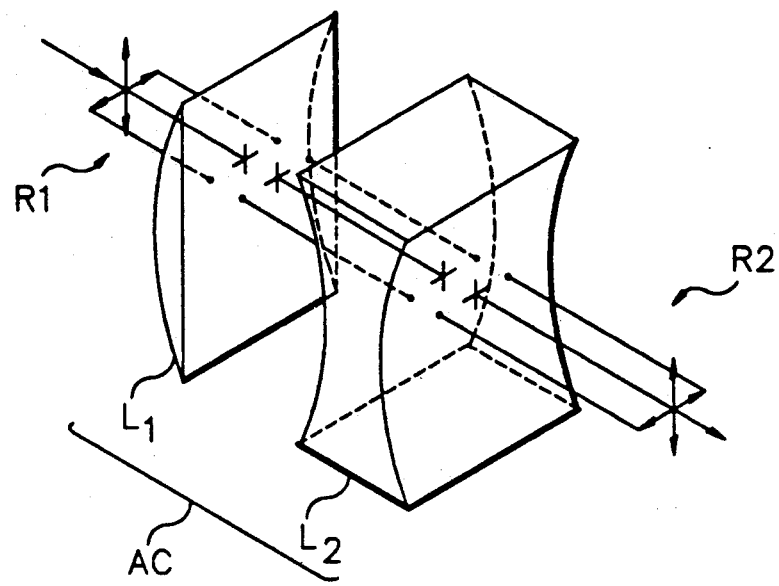
FIG. 6 is a side perspective view of an anamorphic lens configuration suitable for use in the image receiving system of FIG. 4.

Means for effecting the contemplated anamorphic function may be understood with reference to FIG. 6, where a cylindrical afocal converter AC is shown. The converter may comprise a positive cylindrical lens $L_1$ which in turn is optically coupled to a negative cylindrical lens $L_2$. Light rays representative of a given image $R_1$ are modified by the first cylindrical lens $L_1$ and then modified again by the second cylindrical lens $L_2$ which reimages the light rays in the original object plane, leaving a stigmatic but distorted image $R_2$. (In FIG. 5, the illustrated embodiment of a cylindrical afocal converter AC is illustrated for clarity as two cylindrical lenses drawn as square lenses because it is easier to visualize them than if they were drawn round.)

Figure 7A:
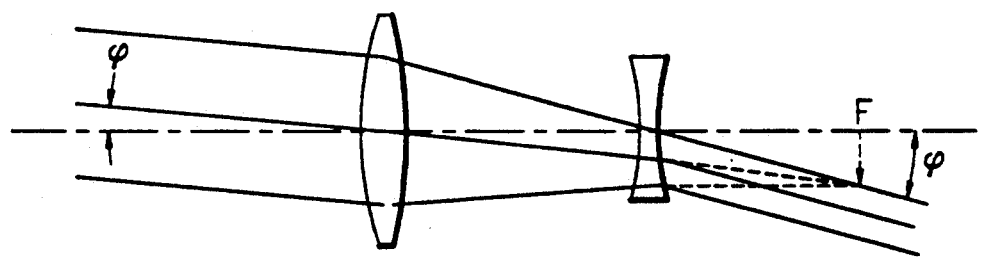
FIGS. 7(a) and 7(b) are dioptric and transverse schematic views, respectively, of the anamorphic lens configuration of FIG. 6.
Figure 7B:
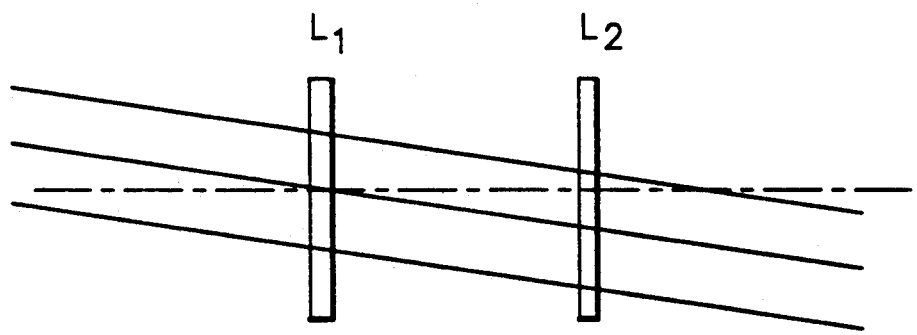

FIG. 7(a) is a side view of the cylindrical afocal converter AC and shows a beam of parallel light rays passing through the negative and positive lenses and emerging, still parallel. The beam is expanded. The top view (FIG. 7(b)) of the same converter shows the cylindrical lenses as windows because there is no surface curvature in that direction; a beam of light will be passed without expansion or compression.

In the dioptric plane shown in FIG. 7(a), the positive cylindrical lens $L_1$ forms an image of an infinitely distant subject at its focal point F. This, then, serves as the (virtual) subject to the negative lens ($L_2$), with its focal point also at F, which in turn will image at infinity. In the transverse plane (FIG. 7b), the subject and image are identical and also at infinity; but, although the angular subtense of the subject in the transverse plane has remained unaffected—equal to $\phi$—the angular subtense in the dioptric plane has been magnified by a factor ($\phi'/\phi$), which is approximately equal to the ratio of the focal lengths of the two lenses.

Figure 8A:
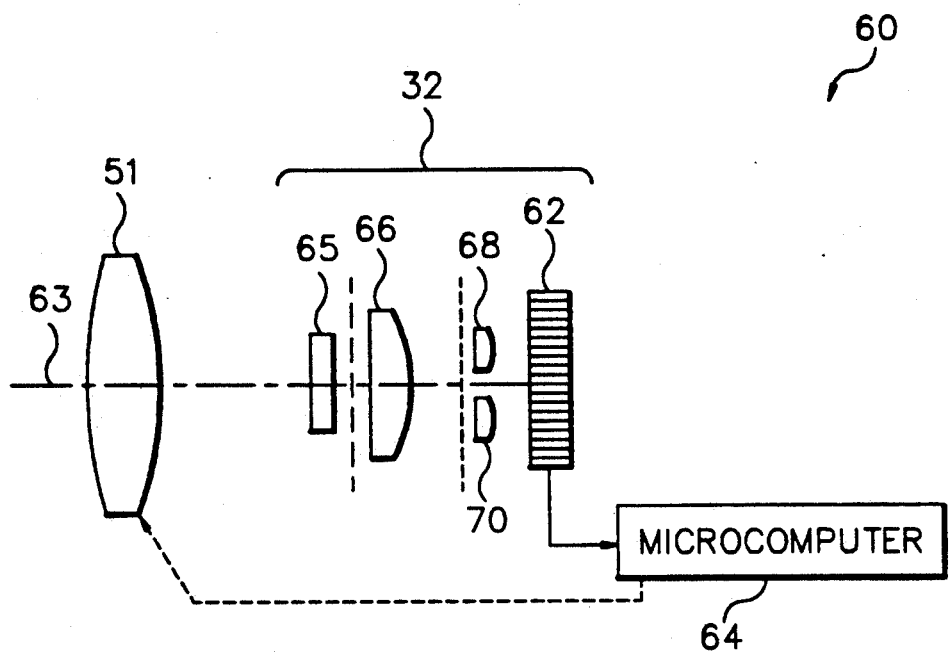
FIGS. 8(a) and 8(b) are a side schematic views of preferred embodiments of the improved autofocussing system of FIG. 3.

In accordance with the invention, an optical system that fulfills the above-listed functions (anamorphosis and image separation) will serve as an embodiment of the contemplated image signal forming means 32. As illustrated in FIG. 8(a), a first preferred embodiment of an autofocus system 60 is contemplated wherein the focussing lens 51, image signal forming means 32, and image signal conversion means 34 (in the form of a segmented CCD array 62) are aligned on the optical axis 63. The output of the CCD array 62 is provided to microcomputer 64 for effecting control of the focus of the focussing lens 51. The image signal forming means 32 includes combined optical elements 65, 66, 68, and 70 that are configured so as to perform the above-described two functions. In the illustrated embodiment, numeral 65 denotes an afocal cylindrical converter as was described with reference to FIG. 6, numeral 66 denotes a condenser lens, and numerals 68 and 70 denote respective separation lenses. These optical elements are shown as being spaced apart merely for the purposes of illustration, and such configuration is not limiting. For example, it is contemplated that in some applications the afocal converter 65 may be located adjacent the other side of the condenser lens 66, or may be contiguous with the condenser lens 66 on either of its sides, or may be contiguous with the pair of separation lenses 68 and 70.

In a second preferred embodiment of the autofocussing system 60, the requisite functions of the image signal forming means 32 are provided by integrating an anamorphotic characteristic into the condenser lens 66 and/or the pair of separation lenses 68 and 70. Thus, and as indicated by the numeral 32' in FIG. 8(b), the individual anamorphic lens element such as the converter 65 of FIG. 8(a) may be omitted, and the image signal forming means 32' is comprised of an anamorphotic combination of a condenser lens 66' and separation lenses 68' and 70'.

Figure 8B:
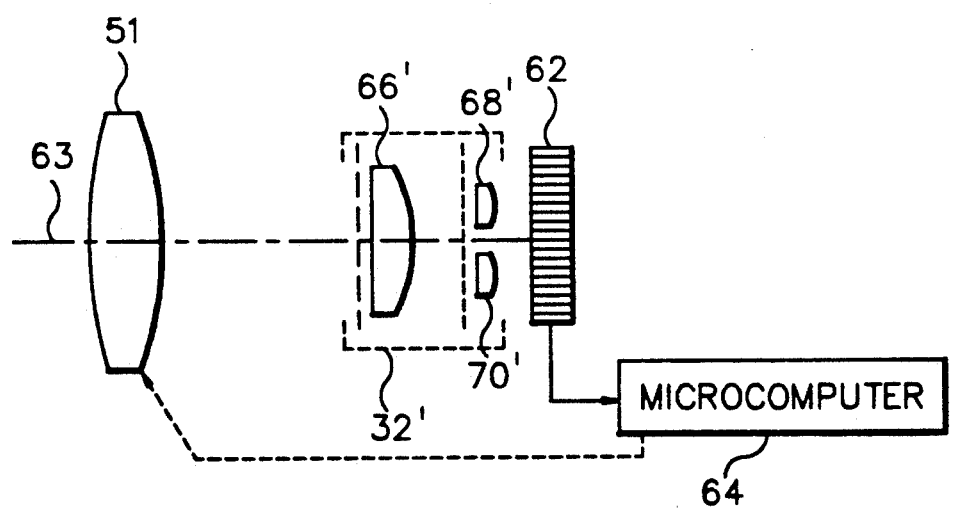

Although FIGS. 8(a) and 8(b) show a single image signal forming means 32 or 32' coupled with a single image signal conversion means 34, it is contemplated that the number and arrangement of such means may differ than that illustrated, depending upon the application. For example, in additional or alternative embodiments, additional image signal forming means and image signal conversion means may be configured in other ways to provide enhanced focus detection of vertically- or laterally-displaced subjects. Each of the image signal conversion means would thereby detect the luminance distribution of a respectively-divided area of the image field. However, and according to the present invention, each image signal conversion means (being aligned with a respective image signal forming means 32 or 32' constructed according to the teachings herein) will receive a luminance distribution having at least one dimension of its aspect ratio greater than that heretofore accomplished in conventional autofocussing apparatus.

The invention has been described in detail with particular reference to preferred embodiments thereof, but it will be understood that variations and modifications can be effected within the spirit and scope of the invention.

Accordingly, the foregoing examples are drawn with reference to an autofocussing imaging system such as a photographic camera; however, the application and utility of the subject invention should not be considered as being limited to camera operations, as other imaging systems and their ancillary operations will also benefit from this invention.

What is claimed is:

1. Improved autofocussing system for effecting focus control with respect to a plurality of subjects that define a subject field image, comprising:
    anamorphic image signal forming means for receiving the subject field image and for providing at a sensor plane separation images of the subject field image, such that each separation image is compressed in a predetermined dimension;
    image signal conversion means for sensing the separation images and for providing a signal indicative thereof; and
    computing means for determining, in accordance with the signal from the conversion means, one or more autofocus control signals.

2. The autofocussing system of claim 1, wherein the image signal forming means comprises a condenser lens means and separation image-forming means, said condenser lens means and separation image-forming means having in combination an anamorphic characteristic.

3. The autofocussing system of claim 1, wherein the image signal forming means comprises a condenser lens means having an anamorphic characteristic.

4. The autofocussing system of claim 1, wherein the image signal forming means comprises a separation image-forming means having an anamorphic characteristic.

5. The autofocussing system of claim 1, wherein the image signal forming means further comprises a cylindrical afocal converter having an anamorphic characteristic.

6. The autofocussing system of claim 5, wherein the cylindrical afocal converter comprises a lens system including a first positive cylindrical lens and a second negative cylindrical lens which in combination provide an anamorphic characteristic.

7. The autofocussing system of claim 1, wherein the predetermined dimension of compression corresponds to the vertical dimension of the subject field image.

8. The autofocussing system of claim 1, wherein the predetermined dimension of compression corresponds to the horizontal dimension of the subject field image.

9. The autofocussing system of claim 1, wherein the image signal forming means has defined therein a longitudinal axis and wherein the predetermined dimension of compression is provided in a direction transverse to the longitudinal axis of the image signal conversion means.

10. The autofocussing system of claim 9, wherein the image signal conversion means comprises a linear CCD array.

11. the autofocussing system of claim 9, wherein the image signal conversion means comprises an area CCD array.

12. The autofocussing system of claim 9, wherein the image signal conversion means comprises a stacked arrangement of plural linear CCD arrays.

13. Improved autofocussing system for focussing a plurality of subjects in a subject field, comprising:
- an optical assembly focusable according to the position of at least one positionable optical element therein;
- image signal forming means for providing, with respect to a subject field focussed by the optical assembly, anamorphic separation images of the subjects in the subject field such that each separation image is compressed in a predetermined dimension;
- means for sensing an offset of the separation images and for providing data indicative of the separation image offset; and
- computing means for determining, in accordance with the data, an adjustment of the lens element position and for outputting one or more autofocus control signals for effecting the adjustment.

14. The autofocussing system of claim 13, wherein the image signal forming means comprises a condenser lens means and separation image-forming means, said condenser lens means and separation image-forming means having in combination an anamorphic characteristic.

15. The autofocussing system of claim 13, wherein the image signal forming means comprises a condenser lens means having an anamorphic characteristic.

16. The autofocussing system of claim 13, wherein the image signal forming means comprises a separation image-forming means having an anamorphic characteristic.

17. The autofocussing system of claim 13, wherein the image signal forming means comprises a cylindrical afocal converter having an anamorphic characteristic.

18. The autofocussing system of claim 17, wherein the cylindrical afocal converter comprises a lens system including a first positive cylindrical lens and a second negative cylindrical lens which in combination provide an anamorphic characteristic.

19. The autofocussing system of claim 13, wherein the predetermined dimension of compression corresponds to the vertical dimension of the subject field image.

20. The autofocussing system of claim 13, wherein the predetermined dimension of compression corresponds to the horizontal dimension of the subject field image.

21. The autofocussing system of claim 13, wherein the image signal forming means has defined therein a longitudinal axis and wherein the predetermined dimension of compression is provided in a direction transverse to the longitudinal axis of the image signal conversion means.

22. The autofocussing system of claim 21, wherein the image signal conversion means comprises a linear CCD array.

23. The autofocussing system of claim 21, wherein the image signal conversion means comprises an area CCD array.

24. The autofocussing system of claim 21, wherein the image signal conversion means comprises a stacked arrangement of plural linear CCD arrays.

* * * * *